July 8, 1958 J. R. WILLS ET AL 2,841,942
CARTON FOLDING AND CLOSING MEANS
Filed Feb. 19, 1954 10 Sheets-Sheet 1

July 8, 1958

J. R. WILLS ET AL

2,841,942

CARTON FOLDING AND CLOSING MEANS

Filed Feb. 19, 1954

July 8, 1958   J. R. WILLS ET AL   2,841,942
CARTON FOLDING AND CLOSING MEANS
Filed Feb. 19, 1954   10 Sheets-Sheet 4

July 8, 1958  J. R. WILLS ET AL  2,841,942
CARTON FOLDING AND CLOSING MEANS
Filed Feb. 19, 1954  10 Sheets-Sheet 5

July 8, 1958  J. R. WILLS ET AL  2,841,942
CARTON FOLDING AND CLOSING MEANS

Filed Feb. 19, 1954  10 Sheets-Sheet 6

INVENTORS
John R. Wills
Clarence W. Jane
Coulson, Pitzner, Hubbard & Wolfe
ATTORNEYS

July 8, 1958  J. R. WILLS ET AL  2,841,942
CARTON FOLDING AND CLOSING MEANS
Filed Feb. 19, 1954  10 Sheets-Sheet 7

INVENTORS
John R. Wills
Clarence W. Jane
Carlson, Pitzner, Hubbard & Wolfe
ATTORNEYS July 8, 1958   J. R. WILLS ET AL   2,841,942
CARTON FOLDING AND CLOSING MEANS Filed Feb. 19, 1954   10 Sheets-Sheet 10

United States Patent Office 2,841,942
Patented July 8, 1958

2,841,942

CARTON FOLDING AND CLOSING MEANS

John R. Wills and Clarence W. Jane, Detroit, Mich., assignors to Ex-Cell-O Corporation, Detroit, Mich., a corporation of Michigan Application February 19, 1954, Serial No. 411,468

10 Claims. (Cl. 53—375)

This invention relates to machines for liquid charging and closing of paper containers and has particular reference to means for folding and closing the carton mouths after they are filled.

With the acceptance of the paper carton for the distribution of milk or other fluids, it is desirable that this means of packaging be made economically available in small as well as large machines. Toward this end, it is desired that in filling and closing machines using such containers the means for closing the top of the filled container should be both completely automatic while at the same time being simple in operation and low in cost and maintenance. At the same time, however, as is consistent with requirements of smaller machines, especially, it is necessary that the closing means be capable of operating on containers of various sizes with little or no changeover which would make the machine less useful or economical for small runs.

Accordingly, it is a primary object of the invention to provide for use with paper containers an automatic fluid charging machine having a simple and versatile container closing mechanism.

A further object is to provide automatic closing means for paper containers of the gable top type which is simple and foolproof in operation.

A still further object is to provide such an improved closing means which may be utilized for closing containers of different capacity with minimum adjustment or change.

Another further object is to provide such closing means which is relatively inexpensive and free of maintenance.

Further objects and advantages of the invention will become apparent as the following description proceeds taken in connection with the accompanying drawings, in which.

While the invention is susceptible of various modifications and alternative constructions, a preferred embodiment has been shown in the drawings and will herein be described in detail, but it is to be understood that there is no intention to limit the invention to the specific form disclosed, the intent being, on the contrary, to cover all modifications, alternative constructions and equivalents falling within the spirit and scope of the invention as expressed in the appended claims.

Referring more specifically to the drawings, the invention is there incorporated in a machine 20 adapted in this instance to receive a quantity of milk to be discharged in measured amounts into paper containers or cartons and automatically fill, close, staple and seal the cartons for retail distribution. While such machines may be termed filling machines or closing machines, it is the closing or folding means prior to stapling and its co-operation with the machine conveyor system and the remainder of the machine which is the subject of the present invention. Accordingly, the general arrangement of the machine and its operation is illustrated in the drawings and briefly described for a better appreciation of the invention itself. For a more detailed description of the machine than that supplied in the following paragraphs, reference is made to the co-pending application of James F. Earp and Clarence M. Clemens, Serial No. 411,306 filed February 19, 1954, which has issued as Patent No. 2,750,721, and assigned to the assignor of the present invention in which the machine generally and in certain mechanisms incorporated in it are described and claimed.

Figure 6:
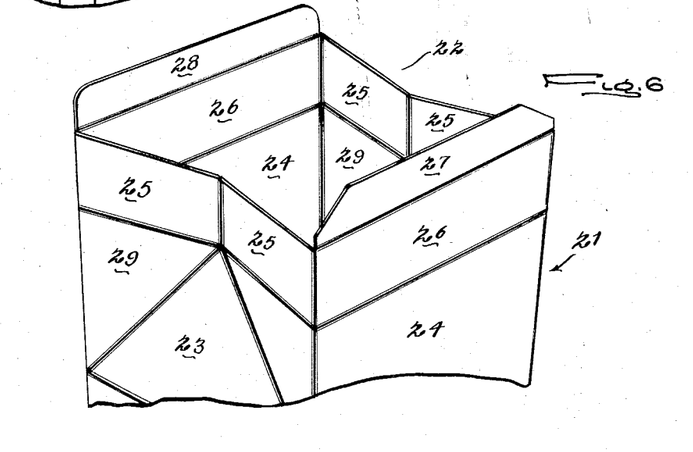
Fig. 6 is a fragmentary perspective of a paper container of the gable type prepared for automatic closing.
Figures 8, 9:
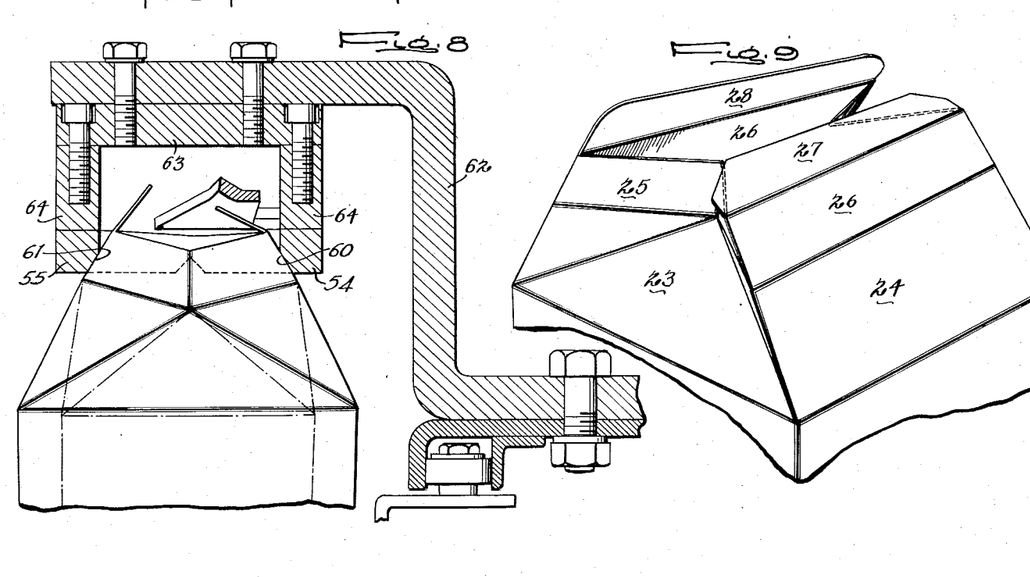
Fig. 8 is a section taken in the plane of the line 8—8 of Fig. 7 illustrating the preliminary folding of the gable sides and the tuck flap and further illustrating the application of the folding means to different size cartons.
Fig. 9 is another fragmentary perspective of a container showing the gable top partially folded to present a pocket into which the pocket flap is to be guided by the closing means.

For use in the specific machine to be generally described in the following paragraphs, waxed paperboard containers 21 of the gable top closure type are employed. These containers, shown open in Fig. 6, are of a known type with an upper end or mouth portion 22 having horizontally based triangular panels 23 defined by score marks on one pair of opposite sides, which are tucked inwardly toward each other along the score lines, when rectangular panels 24 on each of the other pair of opposite sides are drawn together. Adjoining the apex of each triangular panel 23 are horizontal and vertical score lines defining a pair of top rib panels 25 which fold into inward tuck pleats and above each rectangular gable panel 24 at the same level is a single rectangular top rib panel 26. Above one of the outer rib panels 26 is a flap 27 which is designed to be tucked into the pocket formed between the tucked-in inner rib panels 25 and the opposite side rib panel 26 (Fig. 9). Extending from that opposite rib panel is a sealing flap 28 designed to be folded over the rib to complete the rib 29 (Fig. 20) closing of the carton. The cartons are preferably made with tapered sides so that they may be nested to facilitate storage. While in the drawings of the machine a half-gallon size container is illustrated, it is to be understood that other size containers such as quart, pint, third-quart and half-pint may be substituted, the different containers having the same general type of gable closure. As ordinarily preconditioned, the tuck sides having the triangular panels are folded or pushed slightly toward each other to the degree shown in Fig. 6.

Figure 1:
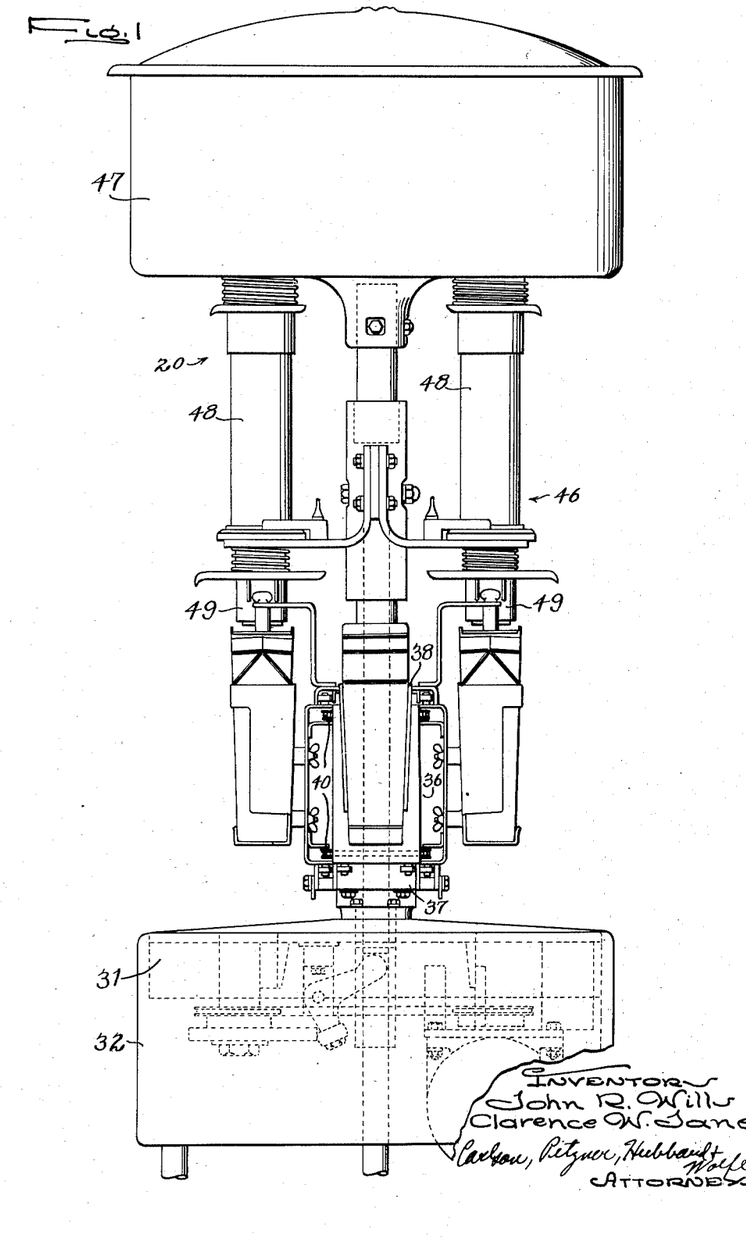
Figure 1 is an end elevation of a fluid charging and closing machine embodying the invention, and particularly showing the filling end of the machine.
Figure 2:
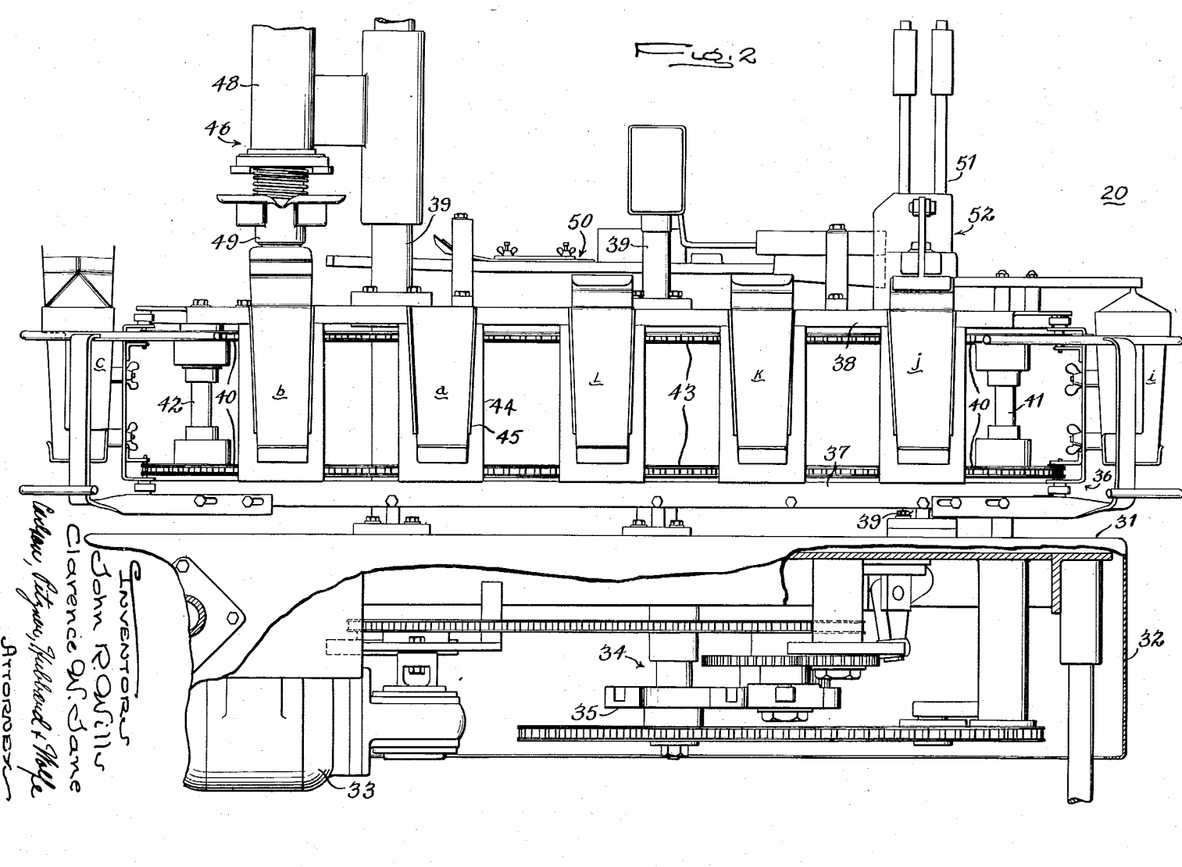
Fig. 2 is a side elevation of the machine of Fig. 1 from the operator's side showing various stations of the container conveyor and being partly in section to better illustrate the driving mechanism.

The filling and closing machine is organized upon a frame structure or table 31 having a skirt 32 around it which encloses the drive motor 33 and the timed power transfer system 34 located below the table top. The power transfer system includes a chain drive for a Geneva wheel assembly 35 which is employed to impart an intermittent motion to the conveyor 36. The conveyor suitably comprises elongated top and bottom conveyor support plates 37 and 38 which are supported and spaced from each other by three tubular supports 39 spaced along its length and secured to the table. The tubular supports are hollow to provide mechanical or electrical control from below the table top. Upper and lower chain sprockets 40 are provided on each of two sprocket shafts 41 and 42 positioned between the ends of the top and bottom conveyor plates, the right hand sprocket shaft as oriented with respect to the operator's position (Fig. 2) extending below the table surface to the power transfer system and the left hand sprocket shaft being journaled in bearings axially adjustable with respect to the conveyor major axis to provide the proper operating tension of upper and lower chain belts 43. Carrier plates 44 are pivotally connected to the top and bottom conveyor chains at spaced intervals therealong and are also provided with guide rollers at each plate corner which ride in horizontal guideways at the sides of the top and bottom conveyor plates 37 and 38, thus providing an accurately predetermined conveyed carton path along one side of the conveyor and back along the other side. Conveyor baskets or pockets 45 for holding the cartons to be processed at the proper elevation and without causing undue wear on the cartons are provided for each conveyor plate.

Figure 3:
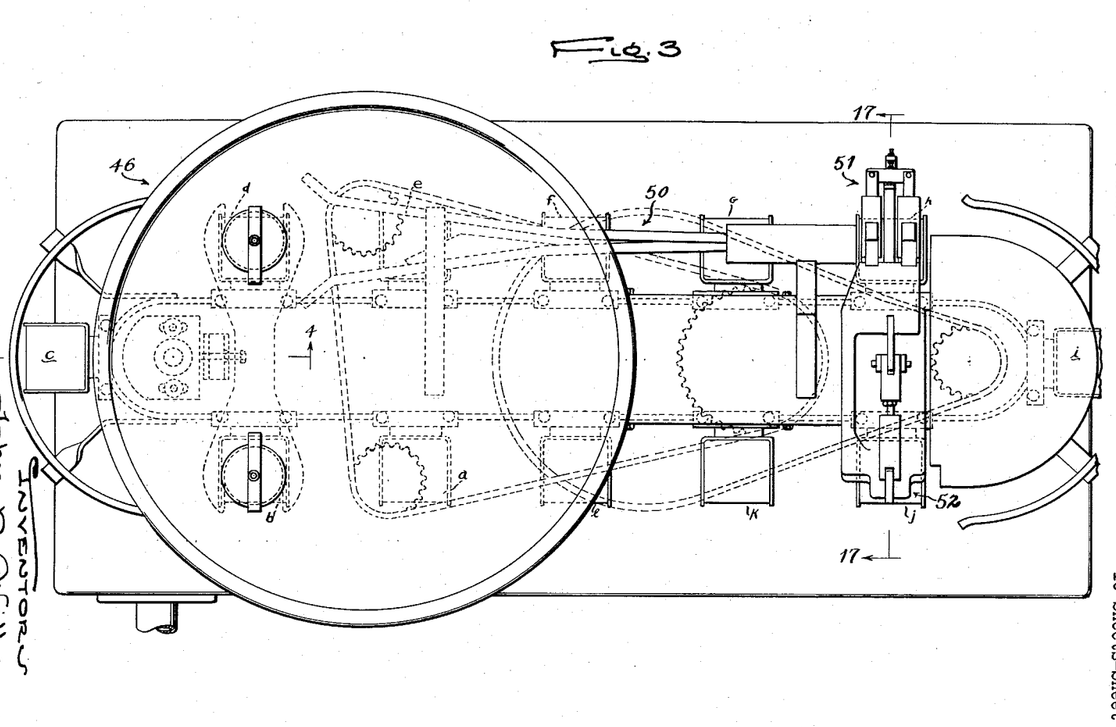
Fig. 3 is a plan view of the machine of Fig. 1 showing the various positions of the machine conveyor.
Figure 4:
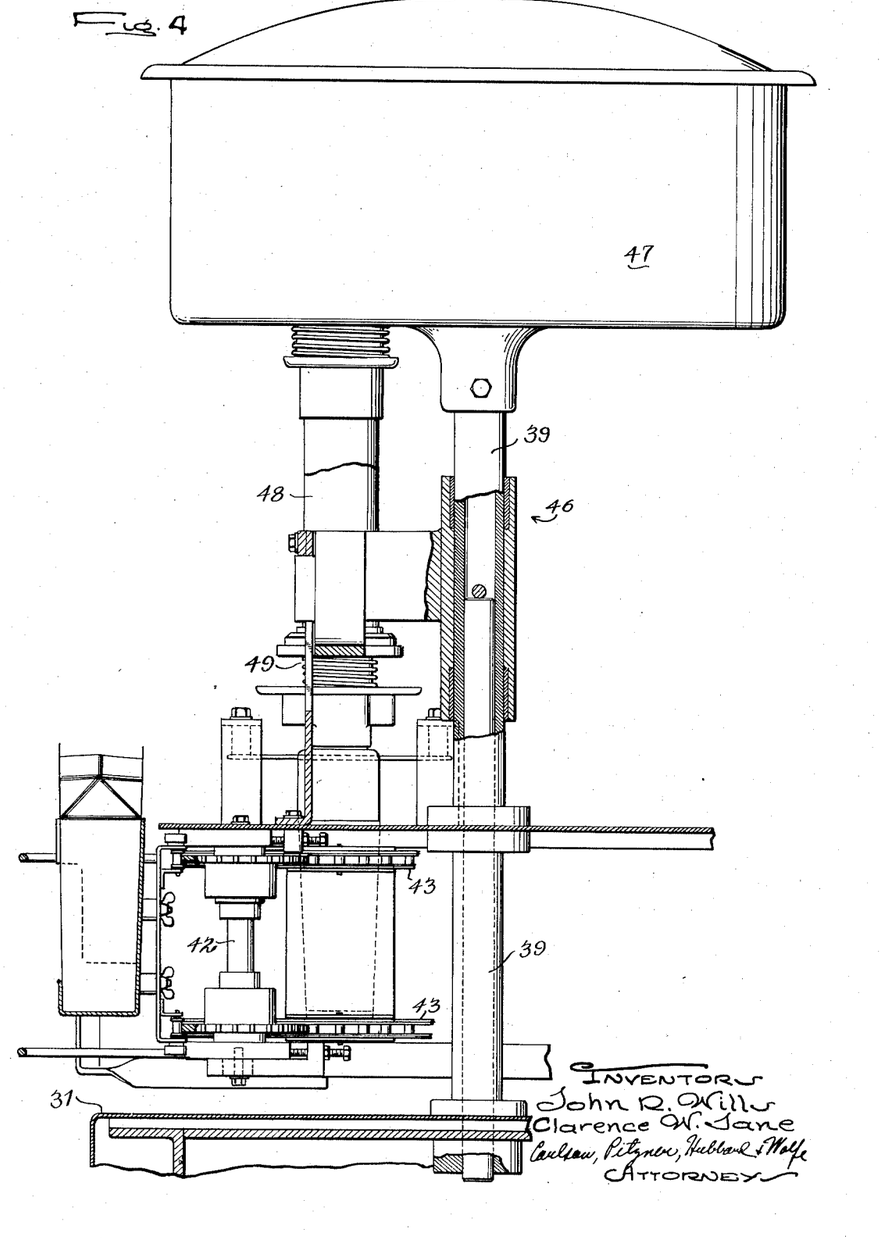
Fig. 4 is a partial vertical section taken in the plane of the line 4—4 of Fig. 3 and particularly illustrating the conveyor adjusting means.

While such a machine may employ a greater or lesser number of conveyor pockets and conveyor dwell positions or stations, in the particular machine illustrated twelve conveyor dwell stations and twelve corresponding conveyor pockets are provided as exemplary of the capacity of a small machine in which the automatic closing means embodying the present invention may be profitably incorporated. For convenience of reference, these twelve stations are indicated in the plan view of Fig. 3, starting with loading station $a$ and proceeding clockwise to the twelfth and last position $l$ where the ready-to-deliver containers are unloaded.

At the left end of the conveyor is the filling unit 46 comprising an overhead bowl or tank 47 for the milk or other fluid to be discharged into the containers, the bowl being supported from an upper extension of the left hand tubular support 39. A pair of transfer flasks 48 are held over conveyor positions $b$ and $d$ respectively and are actuated through a cammed shaft in the tubular support 39 which moves the transfer flask upward to open measuring valves in the bottom of the liquid bowl and downward again during the dwell periods so that dumping valves 49 at the bottom of each of the transfer flasks may be automatically operated in the presence of a carton. Preferably both filling unit assemblies are employed, each charging a container with one-half the desired total charge. After a conveyed carton has been carried around the filling unit assembly bridging the left end of the conveyor it passes to and through stations $e$, $f$ and $g$ along which is positioned the closing guide means 50 embodying the invention and which is described in detail in following paragraphs. By closing here is meant the folding assembly of the scored panels of the mouth of the container so that the carton is ready for stapling in position $h$ where a stapling mechanism 51 staples the top rib of each container when a container is present during the conveyor dwell there. The stapled carton passes next around the sprocket to station $j$ where the several layers of waxed paper comprising the top rib of the gable top container are clamped and heated by sealing means 52. Both the stapler and sealer are actuated during the respective dwell periods by an actuating linkage bridging the right hand end of the conveyor in response to the position of a cammed actuating shaft within the right hand tubular support 39. The sealed container then advances through final stations $k$ and $l$, and is removed, ready for distribution.

Figure 5:
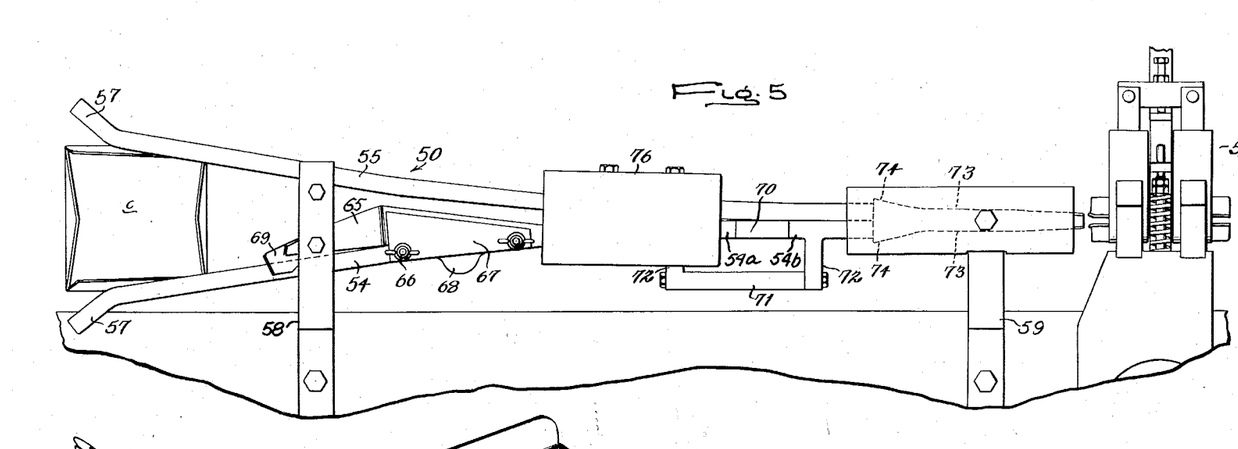
Fig. 5 is a detail of a portion of the plan view of Fig. 3 illustrating the closing means incorporating the invention with a container at the beginning of the closing operation.
Figure 7:
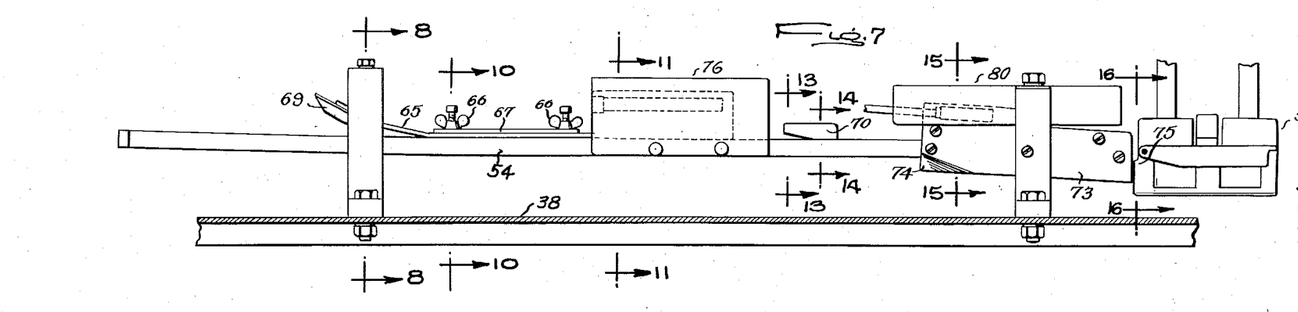
Fig. 7 is a side elevation of the closing means shown in plan view in Fig. 5.

In accordance with the invention, the closing guide means 50 shown in plan view in Fig. 5 and in side elevation in Fig. 7, includes a main pair of stationary guides 54 and 55 spaced apart in a substantially horizontal plane parallel to the conveyor axis at a level intercepting the mouth of the conveyed cartons. In the example shown, the guides are fabricated from steel bars of rectangular cross section and which extend along a horizontal guide center axis 56 midway between the bars from near the exit of the second filling station $d$ where the bars are spread apart with the leading ends 57 preferably further outwardly bent to insure guiding the mouth of the maximum width container utilized in the machine. The bars converge toward the center axis in the direction of conveyor travel and extend to a point near the stapler station. While the inner bar 54 is divided into interconnected first and second sections 54a and 54b as explained hereinafter, it is otherwise referred to as a single bar for clarity of explanation. The bars are suitably supported and spaced with respect to each other and to the conveyor by first and second bracket assemblies 58 and 59, each bracket assembly being bolted to the bars and to the stationary conveyor top plate 38.

The guide itself can be more readily described and understood by considering its function with respect to the progress of a filled carton mouth along the guide axis 56 and reference is accordingly made to the state of closure produced at various regions along the guide.

As previously mentioned, the container mouth 22 (Fig. 6) is preconditioned so that inwardly directed pressure applied to the opposite side panels 26 causes the other pair of sides to fold inwardly and form opposing tuck pleats. The cartons are therefore necessarily placed in the conveyor baskets with the side panels 26 parallel to the conveyor path so that the converging guide bars bear against the panels to close the carton mouth and also selectively and sequentially tuck the top flap 27 into the carton mouth and bend the top flap 28 over the carton mouth. To this end the contour of the rod bearing surfaces smoothly and progressively changes to closely fit the angle of disposition of the panels as they are progressively bent or folded as shown particularly in Figs. 8, 10, 11 and 13.

Accordingly, in the leading or forward end portion of the guide, the facing side walls of the two guide bars 54 and 55 are initially vertical but their respective lower facing edges 60 and 61 are beveled or chamfered by an increasing amount corresponding to the angle imparted to the rectangular side panels 24 as the sides are bent inwardly by the converging bars. This conformation is shown in Fig. 8, which also shows the details of the first bracket assembly 58. This may suitably include the main bracket strap 62 and a lateral spacer bar 63 welded thereto, with vertical spacer blocks 64 welded to the bars and bolted to the spaced bar, the construction illustrating the simplicity of fabrication and the minimum of machining required for the bar-type guide. While the carton mouth is being initially partially closed by the initial length of the guide, the top or tuck 27 which is on the panel 26 being bent over by the guide bar 54 must be bent over ahead of the opposite sealing flap 28. To this end a tuck flap guide plate 65 preferably made of sheet metal in the general form of an obtuse triangle has its lagging or trailing portion of its long side fastened to the top of the inner guide bar 54 suitably by bolts with wing nuts 66 under a reinforcing and clamping plate 67 so that it can be readily removed and adjusted in height by removal or insertion of a shimming plate 68 thereunder. The leading end of the triangular piece is bent upwardly from the guide bar so that the top of the tuck flap 27 passes under it. To insure that the flap is broken in along its score line, a flat camming surface 69 is provided at the very end of the tuck guide, as by a sheet member welded to it. The leading triangle edge progressively approaches the guide axis so that it does not engage the upstanding sealing flap 28. Fig. 8 shows the further bending down of the tuck flap 27 by the tuck guide. It will be appreciated from a consideration of Fig. 8 that the quart size carton shown in dotted outline is closed in the same manner as is the half-gallon size despite the smaller mouth opening. As determined by the difference in mouth size, a shim of predetermined size is removed or inserted under the tuck plate, the tuck plate itself requiring no adjustment.

Figure 10:
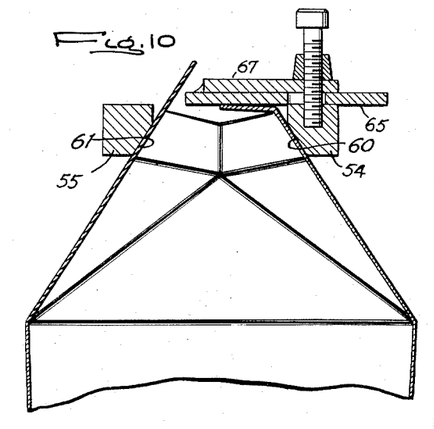
Fig. 10 is a vertical section taken in the plane of the line 10—10 of Fig. 7 showing further the preparation of the tuck flap for entrance into the pocket being formed by the converging gable sides.

Still referring to the tuck plate or guide 65, it is desired, as shown in Fig. 9, that the leading corner of the tuck flap 27 be progressively guided toward the pocket as it is formed between the tucked pleats of panels 25 and the rectangular side panel 26 opposite the side bearing the tuck flap 27. As the elevation of the horizontal leading end of the guide triangle decreases along its length, the tuck flap is bent over to a nearly horizontal position as shown in Fig. 10 near the apex of the triangular tuck guide. Proceeding further along the guide axis past the apex of the tuck flap guide, the trailing triangular edge of the guide recedes toward the guide bar 54 to prevent interfering with the closing of the mouth of the carton and backward folding of the sealing flap 28.

Figure 11:
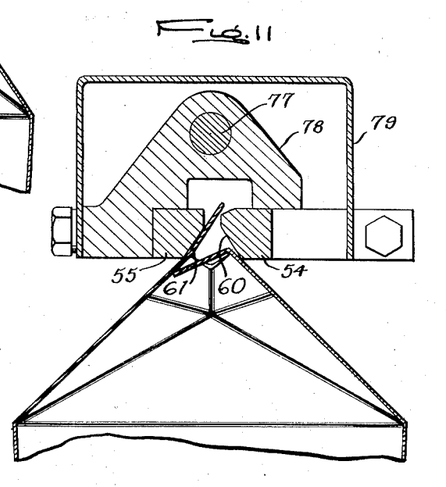
Fig. 11 is a section taken in the plane of line 11—11 of Fig. 7 showing the tuck flap being inserted in the pocket formed by the inward folds of the gable ends.
Figure 12:
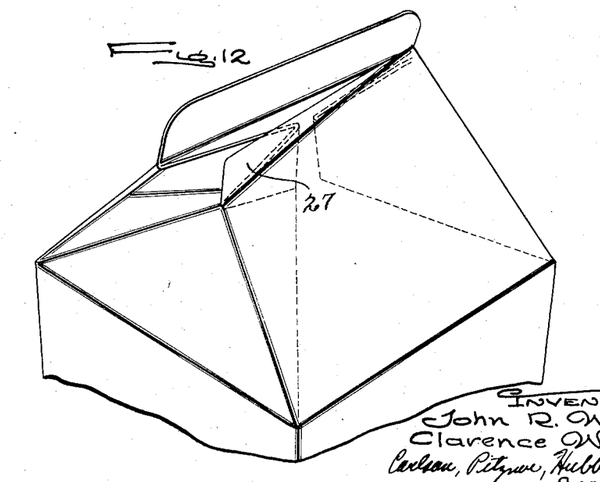
Fig. 12 is a fragmentary perspective of a container showing the simultaneous progressive insertion of the tuck flap and closing of the sides.

Further down the guide axis beyond the tuck flap guide, the further convergence of the guide bars forces the sealing flap to emerge upwardly from between the two bars 54 and 55 while the tuck flap is forced into the narrowing pocket as shown in Fig. 11. This step of closing the carton is further shown in Fig. 12 where the tuck flap is tucked into the tightly closed pocket at the leading edge of the carton and outside of it at the still parially open trailing edge of the carton mouth. Along this length of the still converging guide rods, the upper corner of the guide surface of the guide bar 54 is progressively chamfered or beveled more deeply so that the sealing flap 28 may be bent down by the beveled lower corner of the bearing surface of the other guide bar 55. As the bevel of the upper corner of the bar 54 increases along its length and becomes more nearly horizontal, the bar also tapers from its upper surface to terminate section 54a of the bar, thus removing the guide bearing surface from under the bent over sealing flap 28 so that it is in position to be forced down against the side 26.

The second bar section 54b has its leading end positioned above the tapered-down trailing end of the first inner bar section 54a and provided with a complemental taper to provide downward pressure to the sealing flap 28. A flap-engaging plate 70 on the leading end of bar section 54b extending above the level of the guide bar insures that the upstanding sealing flap will be guided under the bar section 54b. The two sections of the inner guide bar 54 are spliced by a supporting holder or bracket 71 which maintains the vertical spacing between the overlying ends of the bar sections 54a and 54b without in any way interfering with the carton mouth. This is facilitated by laterally directed posts 72 welded on the sides of the bar section away from the guide axis to which the supporting holder is bolted.

Figure 13:
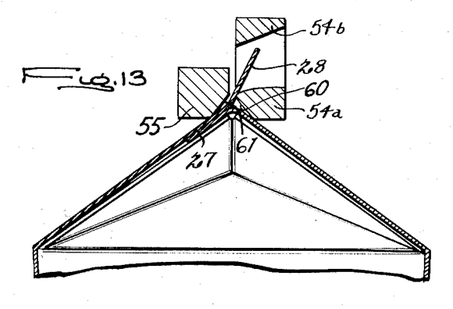
Fig. 13 is a sectional view in the plane of line 13—13 of Fig. 7 showing the beginning of the folding of the sealing flap on the gable top container.
Figure 14:
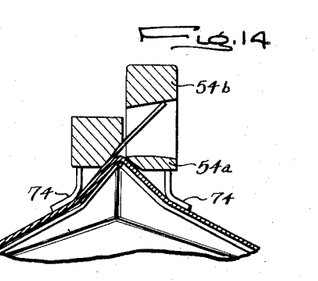
Fig. 14 is a section in the plane of line 14—14 of Fig. 7 showing the beginning of the formation of the upstanding rib on the gable of a container.

The folding of the sealing flap 28 in the region where it is guided from the upper surface of bar section 54a to the lower surface of bar section 54b is illustrated in Figs. 13 and 14. Thus, as shown in Fig. 13, the convergence of the two guide bars 54 and 55 has completed the inner tuck fold of flap 27, but the sealing flap 28 remains upright although bent over in the direction of the low surface of the guide bar 54a. Further along the guide axis as shown in Fig. 14, the second section 54b of the guide bar 54 has its lower surface bearing down on the end of the upstanding sealing flap. Proceeding along the guide, the level of the guiding lower surface of the inner bar drops gradually and smoothly so that the sealing flap is bent over the apex of the gable top of the carton. At the same time, the surface angle changes to conform with that of the gable so as to more smoothly guide the sealing flap against the gable side.

Figure 15:
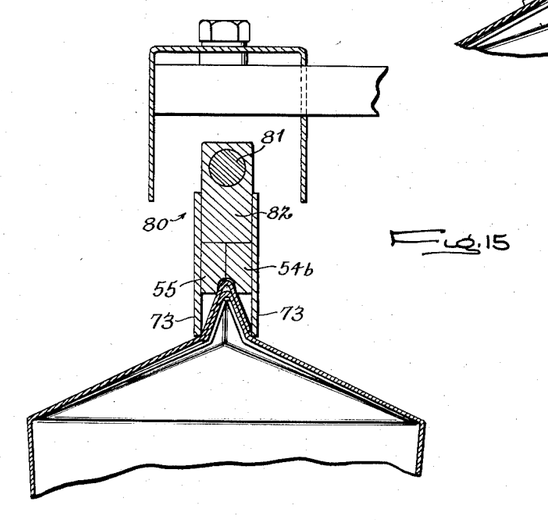
Fig. 15 is a sectional view in the plane of line 15—15 of Fig. 7 showing the upstanding rib on the gable top container as it nears completion.
Figure 16:
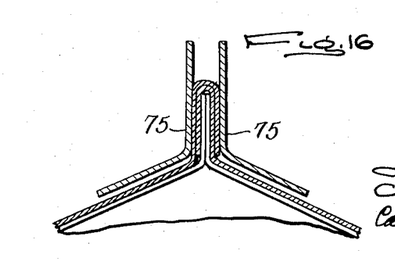
Fig. 16 is a sectional view taken in the plane of line 16—16 of Fig. 7 and shows the completed top rib on the gable top container ready for stapling.

In a last or trailing region of the guide where the guide bars 54 and 55 are in contact and bolted together, the vertical top rib of the gable is formed as indicated in Fig. 15. For this purpose, a pair of vertical guide plates are securely fastened to the exposed outer sides of the final length of the guide bars and extend downwardly therefrom to break in the score lines between the side panels 24 and their associated rib panels 26 and gather the rib 29 of the carton mouth. In the end view of the rib guides 73 shown in Fig. 14, it may be seen that the initial or leading lower ends 74 are flared outwardly at an angle corresponding to that of the gable so as to smoothly engage the gable sides as the rib bend is started along the score lines between the rib panels 24 and 26. Along this final region of the guide length, the two guide bars 54 and 55 are progressively tapered or narrowed in total width so that the rib guides 73 fastened to their sides thereby converge to narrow the carton. Because the drawing together of the rib panels decreases the overall height of the container, the bottom surfaces of the guide bars 54 and 55 slope downwardly. To accomplish this most simply and also conveniently provide a similar incline of the rib plate lower edges, the guide bar ends are bent slightly downwardly. In this way the downward pressure is maintained on the top of the rib by the guide bars which along this final length have but a shallow groove defined by the juncture of their lower surfaces. The pressure both keeps the paper layers of the top rib tightly together and helps force the bottom portions of the rib together. With the folding thus completed by the formation of the top rib 29, the carton top enters the stapling station 51 between stapling guides 75 formed and ready for stapling as shown in Fig. 16. It should be noted that the carton mouth thus closed is not only provided with the gable top shape by the bending mechanism, but the pocket flap is inserted in the opposite pocket created by the tuck folds of the gable top and the sealing flap bent around the closure ends and over the tuck flap to provide an upstanding rib on the container which is self-reinforcing and in a commercially useful form.

The guides 50 are also provided with heater units to soften the wax coatings of the carton mouths both to facilitate making a tight rib fold and also to expedite the final sealing. Accordingly, a first or preheat stage is provided along a length of the guide between the tuck plate 65 and the sectioning of bar 54, which is also the dwell position *f* on the intermittent conveyor 36. In this region the carton mouth is not fully closed (see Fig. 11) and the inner tuck folds or pleats are still exposed to the heating means. As shown in the illustrated embodiment the preheat stage suitably comprises an electric resistance heater unit 77 positioned in a base in a metallic heat conducting block 78 in contact with guide bars 54 and 55 together with an enclosing cover member over the guide bars and block, the assembly being supported by the guide bars. The open structure and low mass of the guide 50 permits low capacity heating units to be successfully employed, especially in view of the location at a conveyor dwell position, and to also be easily installed.

A second heating stage 80 is provided along the trailing ends of the guide bars immediately preceding the stapler 51. As shown in the drawings (and particularly in Fig. 15), this stage may suitably comprise an electric heater unit 81 axially disposed in an elongated block 82 tapered to fit along the top surfaces of the bars 54 and 55 and between the projecting upstanding sides of the rib guide plates 73 for good heat transfer. A cover or heat shield 83 above the heater is suitably supported from the second guide bracket assembly 59. In this way, the wax on the carton rib members is softened prior to stapling and at least some of the sealing due to melting of the wax is effected. This heating stage preferably extends along at least part of the conveyor dwell position *g* for greater effectiveness.

Figure 17:
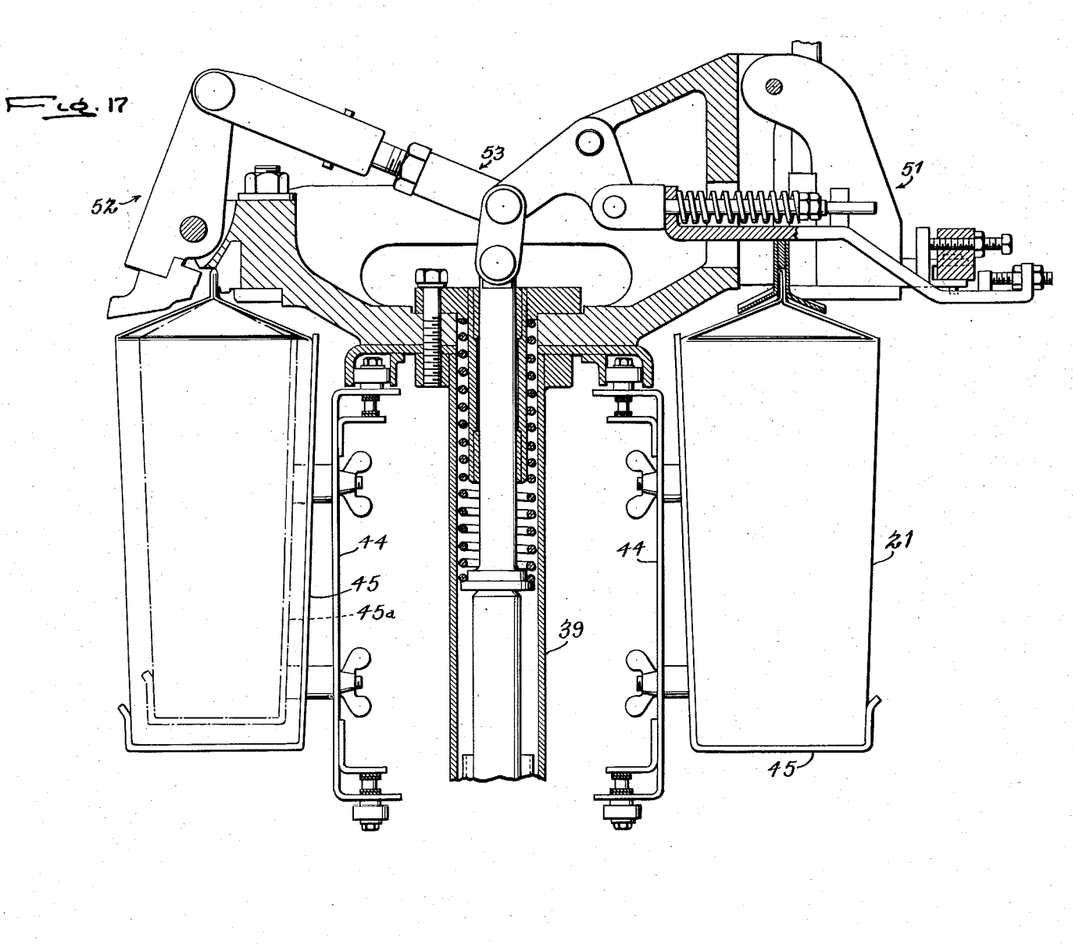
Fig. 17 is a section taken in the plane of line 17—17 of Fig. 3 showing the stapling and final sealing mechanisms for completing the closure after the carton has been closed by folding.

As previously mentioned, after the folding operation performed by the closing guide 50, the stapling and final sealing are performed by the mechanisms 51 and 52 which are shown in some detail in Fig. 17.

Figures 18, 19, 20:
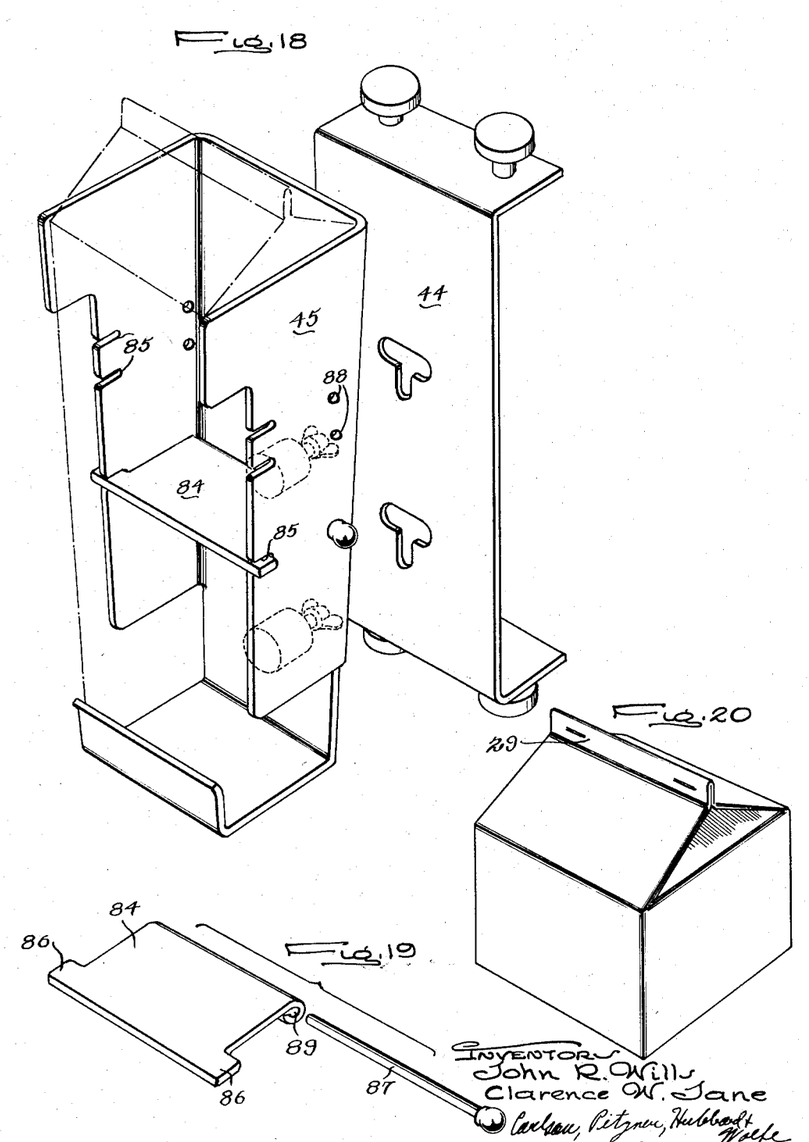
Fig. 18 is a perspective view of a conveyor basket assembly showing the removable bottom slide insert.
Fig. 19 is a detail illustrating the construction of a bottom slide and connecting pin.
Fig. 20 is a perspective view of a filled and closed half-pint container having the same gable top closure feature as the larger containers also accommodated by the machine of Fig. 1.

To facilitate use of the closing guide in a machine for successfully closing containers of different sizes, the carrier plates 44 and basket assemblies 45 previously mentioned are arranged with provisions for inserting a removable bottom basket plate 84 at various levels to thus accommodate different height containers, such as the pint, third-quart, and half-pint containers indicated by Fig. 18 and the legend thereon without changing the position of the basket. Fig. 20 shows, as an example, a half-pint container having closure dimensions the same as for a quart carton. Each of these conveyor baskets comprises a channel-shaped sheet metal member having an upright back to aline vertically a container positioned against it. The permanent bottom for the basket is provided by bending the lower end outwardly and then upwardly with a small flange to define a flanged bottom and hold, in the specific example shown, a half-gallon container at the correct level for the various filling and closing operations. Positioned at different levels in the outer edges of each such channel-shaped carrier 45 are slots 85 to accommodate outer corner ears 86 on the removable bottom plate 84 in any of the desired pair of slots. The inner end of the plate 84 is suitably maintained horizontal by a pin 87 passing through guide holes 88 in the opposite channel sides, the inner end 89 of the bottom plate being preferably bent around the guide pin to hold the plate in place.

While the method of operation of the closing guide and its relation to the remainder of the machine has been explained in the description of the guide and machine, it may be noted in conclusion that the closing guide is both simple in operation and fabrication, requiring no difficult or expensive machining in view of the bar and plate construction shown. Despite its simplicity, the guide, without requiring moving parts, closes the carton mouth, selectively and sequentially tucks in one top flap and folds over the other, and forms the carton top rib. At the same time, effective heating means for the closure is readily provided on the guide.

We claim as our invention:

1. Guide means disposed along a substantially horizontal lengthwise axis and operable by the relative movement of a carton mouth therealong for closing an upright rectangular paper carton mouth of a type having first and second opposite sides with upstanding first and second flaps respectively thereon alined parallel to said axis and a second pair of sides disposed to fold inwardly when the first and second sides are bent toward each other, said guide means comprising a first length thereof in which first and second guide bars are disposed along opposite sides of said axis, said bars being spaced at their leading ends and converging progressively along said axis for progressively bending said first and second sides respectively inwardly toward said axis, and a tuck plate secured to the top of the first guide bar, said tuck plate extending toward the axis and having a lower surface for engaging the first upstanding flap and progressively bending it downwardly toward the second side as a carton proceeds through said first length, a second length of said guide in which said first and second guide bars further converge to press said first flap downward against the second side and into the pocket being formed between the second side and the folded other pair of sides, said first bar simultaneously having its top surface tapering down along its length to terminate the bar and permit a second flap to be bent against the top of the first bar by the bearing surface of the second bar, a third length of said guide including a third bar overlying the tapered end of the first bar and having a progressively descending lower surface for folding said second flap down against the outer surface of the first side, said third bar and the continuing length of said second bar progressively converging to meet, and a final length of the guide in which the contiguous extensions of the second and third bars have vertically depending rib forming plates attached to their exposed sides, the bars being progressively narrowed in their overall width so that the plates may gather together the rib forming top portions of the first and second sides.

2. Guide means disposed along a substantially horizontal lengthwise axis and operable by the relative movement of a carton mouth therealong for closing an upright rectangular paper carton mouth of a type having first and second opposite sides with upstanding first and second flaps respectively thereon alined parallel to said axis and a second pair of sides disposed to fold inwardly when the first and second sides are bent toward each other, said guide means comprising a first length thereof in which first and second guide bars are disposed along opposite sides of said axis, said bars being spaced at their leading ends and converging progressively along said axis for progressively bending said first and second sides respectively inwardly toward said axis, and a tuck plate secured to the top of the first guide bar, said tuck plate extending toward the axis and having a lower surface for engaging the first upstanding flap and progressively bending it downwardly toward the second side as a carton proceeds through said first length, a second length of said guide in which said first and second guide bars further converge to press said first flap downward against the second side and into the pocket being formed between the second side and the folded other pair of sides, said first bar simultaneously having its top surface tapering down along its length to terminate the bar and permit a second flap to be bent against the top of the first bar by the bearing surface of the second bar, a third length of said guide including a third bar overlying the tapered end of the first bar and having a progressively descending lower surface for folding said second flap down against the outer surface of the first side, said third bar and the continuing length of said second bar progressively converging to meet, and a final length of the guide in which the contiguous extensions of the second and third bars have vertically depending rib forming plates attached to their exposed sides, the bars being progressively narrowed in their overall width so that the plates may gather together the rib forming top portions of the first and second sides, said bars along said final length descending progressively from the horizontal so that the rib plates and lower surface of the bars may bear against the top fold of the rib as it is formed.

3. In a machine for automatically filling and closing rectangular paper cartons of the gable top closure type in which the open carton mouth has first and second opposed sides with first and second upstanding flaps respectively thereon and a pair of opposite sides disposed to fold inwardly when the first and second sides are bent toward each other, a conveyor means for moving upright filled containers along a horizontal path with the first and second mouth sides alined parallel thereto, a guide for closing the carton mouths comprising first and second guide bars supported with respect to each other and to the machine on opposite sides of the path of the carton mouths, said first and second guide bars being spaced apart at their leading ends and converging toward their trailing end so as to respectively progressively push inwardly and downwardly the first side and first flap and the second side and flap between their converging surfaces as the carton mouth moves therethrough, the contour of the surfaces bearing against the cartons being progressively varied to match the progressively bent attitude of the carton surfaces, said guide including a tuck plate extending from the top of a portion of length of the leading end portion of the first bar toward the other bar over said first flap to bend said first flap toward the second side and present its edge to said second flap to prevent it from being likewise bent so as the carton progresses further into the converging guide bars the first flap is tucked between the inner surface of the second side and the pair of side folds, said first bar being divided along a gradually descending plane at a region further along its length so that the second flap as it is bent over by the second side is directed under the first bar as the carton progresses along the conveyor and progressively folded around the top of the first side, and a pair of depending side plates fastened to the outer sides of said first and second bars at a further distance along their length and extending below them to crease the first and second sides and gather the vertical top portion of the container.

4. In a machine for closing rectangular paper cartons of the gable top closure type in which the open carton mouth has first and second opposed sides forming top panels with first and second upstanding flaps respectively thereon and a pair of opposite sides disposed to fold inwardly when the first and second sides are bent toward each other, a conveyor means for moving upright filled containers along a horizontal path with the first and second mouth sides alined parallel thereto, and a guide for closing the carton mouths comprising first and second guide bars supported with respect to each other and to the machine on opposite sides of the path of the carton mouths, said first and second guide bars being spaced apart at their leading ends and converging to meet at their trailing ends, the said guide bars having facing lower edges which bear directly against the carton surfaces forming the top panels to progressively push inwardly and downwardly and fold the same as the carton mouth moves therethrough, the said edges varying in contour progressively from an initial substantially parallel relation where the edges are in planes lying substantially perpendicular to the said horizontal path to a terminal oblique relation where the edges lie in intersecting planes conforming to the final attitude of the panels of the folded gable top.

5. In a machine for automatically filling and closing rectangular paper cartons of the gable top closure type in which the open carton mouth has first and second opposed sides with first and second upstanding flaps respectively thereon and a pair of opposite sides disposed to fold inwardly when the first and second sides are bent toward each other, a conveyor means for moving upright filled containers along a horizontal path with the first and second mouth sides alined parallel thereto, and a guide for closing the carton mouths comprising first and second guide bars supported with respect to each other and to the machine on opposite sides of the path of the carton mouths, said first and second guide bars being spaced apart at their leading ends and converging toward their trailing ends so as to respectively progressively push inwardly and downwardly the first side and flap and the second side and flap between their converging surfaces as the carton mouth moves therethrough, the contour of the surfaces bearing against the cartons being progressively varied to match the progressively bent attitude of the carton surfaces, and said first guide bar being obliquely divided along an intermediate portion.

6. In a machine for automatically filling and closing rectangular waxed paper cartons of the gable top closure type in which the open carton mouth has a first and second opposed sides with first and second upstanding flaps respectively thereon and a pair of opposite sides disposed to fold inwardly when the first and second sides are bent toward each other, a conveyor means for moving upright filled containers along a horizontal path with the first and second mouth sides alined parallel thereto, a guide for closing the carton mouths comprising first and second guide bars supported with respect to each other and to the machine on opposite sides of the path of the carton mouths, said first and second guide bars being spaced apart at their leading ends and converging to meet at their trailing ends so as to respectively progressively push inwardly and downwardly the first side and first flap and the second side and flap between their converging surfaces as the carton mouth moves therethrough, the contour of the surfaces bearing against the cartons being progressively varied to match the progressively bent attitude of the carton surfaces, and heating means positioned along a portion of said guide and supported from said bars to soften the wax on the carton mouth surfaces adjacent the guide.

7. In a machine for automatically filling and closing rectangular paper cartons of the gable top closure type in which the open carton mouth has first and second opposed sides with first and second upstanding flaps respectively thereon and a pair of opposite sides disposed to fold inwardly when the first and second sides are bent toward each other, a conveyor means for moving upright filled containers along a horizontal path with the first and second mouth sides alined parallel thereto, and a guide for closing the carton mouths comprising first and second guide bars supported with respect to each other and to the machine on opposite sides of the path of the carton mouths, said first and second guide bars being spaced apart at their leading ends and converging to meet at their trailing ends so as to respectively progressively push inwardly and downwardly the first side and first flap and the second side and flap between their converging surfaces as the carton mouth moves therethrough, the contour of the surfaces bearing against the cartons being progressively varied to match the progressively bent attitude of the carton surfaces, said first bar having an upper axially extending portion along a leading end portion to selectively bend said first of said first and second flaps, and said first and second bars having downwardly extending vertical guide portions at their trailing ends.

8. In a machine for automatically filling and closing rectangular paper cartons of the gable top closure type in which the open carton mouth has first and second opposed sides with first and second upstanding flaps respectively thereon and a pair of opposite sides disposed to fold inwardly when the first and second sides are bent toward each other, a conveyor means for moving upright filled containers along a horizontal path with the first and second mouth sides alined parallel thereto, a guide for closing the carton mouths comprising first and second guide bars supported with respect to each other and to the machine on opposite sides of the path of the carton mouths, said guide bars being spaced apart at their leading end and converging toward their trailing end so as to progressively push inwardly and downwardly the first side and first flap and the second side and flap respectively between their converging surfaces as the carton mouth moves therethrough, the contour of the surfaces bearing against the cartons being progressively varied to fit the progressively bent attitude of the carton surfaces, said guide including a tuck plate extending from the top of a portion of length of the leading edge portion of the first bar and extending toward the other bar, said first bar being divided obliquely along a descending plane in a region further along its length, and a pair of depending rib guide side plates fastened to the outer sides of said first and second bars in a final region along their length and extending below them.

9. A guide means disposed along a horizontal axis for closing an upright rectangular paper carton mouth of a type having first and second opposite sides with upstanding first and second flaps respectively thereon when a carton is moved relative to said guide along said axis, said guide comprising first and second guide bars disposed along opposite sides of said axis, said bars being spaced at their leading ends and converging progressively along said axis for progressively bending said first and second sides and flaps thereon respectively inwardly toward said axis, said first bar in an intermediate portion of its length being divided along an oblique plane to provide a transfer path for said second flap from an upper to a lower surface of said bar.

10. A guide means disposed along a horizontal axis for closing an upright rectangular paper carton mouth of a type having first and second opposite sides with upstanding first and second flaps respectively thereon when a carton is moved relative to said guide along said axis, said guide comprising first and second guide bars disposed along opposite sides of said axis, said bars being spaced at their leading ends and converging progressively along said axis for progressively bending said first and second sides and flaps thereon respectively inwardly toward said axis, and a tuck plate secured to the top of an initial portion of the first guide bar extending towards said axis for bending said first flap under said second side, said first bar in a further portion of its length being divided along a progressively descending plane to provide a path for said second flap from an upper to a lower surface of said bar, and first and second bars having a pair of vertically depending rib guide plates attached to the outer sides of said bars along a final length thereof.

References Cited in the file of this patent
UNITED STATES PATENTS

| | | |
|---|---|---|
| 2,109,537 | Kimball | Mar. 1, 1938 |
| 2,156,037 | Wollenweber | Apr. 25, 1939 |
| 2,377,103 | Pittman | May 29, 1945 |
| 2,669,815 | Zinn et al. | Feb. 23, 1954 |